United States Patent
Dey et al.

(10) Patent No.: US 11,625,536 B2
(45) Date of Patent: Apr. 11, 2023

(54) SYSTEM AND METHOD FOR IDENTIFICATION AND PROFILING ADVERSE EVENTS

(71) Applicant: Tata Consultancy Services Limited, Mumbai (IN)

(72) Inventors: Lipika Dey, Gurgaon (IN); Ishan Verma, Gurgaon (IN); Saumya Bhadani, Gurgaon (IN); Mohammad Shakir, Gurgaon (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 336 days.

(21) Appl. No.: 16/823,584

(22) Filed: Mar. 19, 2020

(65) Prior Publication Data
US 2021/0182493 A1  Jun. 17, 2021

(30) Foreign Application Priority Data
Dec. 13, 2019 (IN) .............................. 201921051876

(51) Int. Cl.
*G06F 40/258* (2020.01)
*G06F 40/295* (2020.01)
(Continued)

(52) U.S. Cl.
CPC ........ *G06F 40/295* (2020.01); *G06F 16/3344* (2019.01); *G06F 16/38* (2019.01);
(Continued)

(58) Field of Classification Search
CPC .... G06F 40/295; G06F 16/38; G06F 16/3344; G06F 40/258; G06F 40/253; G06F 40/205; G06N 20/00; H04L 63/102
See application file for complete search history.

(56) References Cited

U.S. PATENT DOCUMENTS

| 7,860,852 B2 | 12/2010 | Brunner et al. |
| 7,969,306 B2 | 6/2011 | Ebert et al. |

(Continued)

FOREIGN PATENT DOCUMENTS

| JP | 2005-515135 | 5/2005 |

OTHER PUBLICATIONS

Xiang, A Survey of Event Extraction From Text, Nov. 29, 2019, IEEE Access, vol. 7, pp. 173117-173125 (Year: 2019).*
(Continued)

*Primary Examiner* — Vijay B Chawan
(74) *Attorney, Agent, or Firm* — Finnegan, Henderson, Farabow, Garrett & Dunner LLP (57) ABSTRACT

With the proliferation of data and documents available on the internet and other information sources, analysis of adverse events poses a serious technical challenge on account of associated data volume and variety. This disclosure relates generally to identification and profiling of adverse events. By receiving a set of articles from a plurality of data sources and utilizing a series of Natural Language Processors, NLP techniques are employed to identify implicit and explicit adverse events. Entity statistics and sentiment extraction and analysis is performed. An ontology based adverse event identification framework is proposed for identification and profiling of implicit adverse event. An attention based bi-directional long short term memory network for adverse event identification and classification is proposed.

20 Claims, 4 Drawing Sheets

(51) Int. Cl.
    *G06F 16/38*     (2019.01)
    *G06N 20/00*     (2019.01)
    *G06F 16/33*     (2019.01)
    *G06F 40/253*     (2020.01)
    *G06F 40/205*     (2020.01)
    *H04L 9/40*     (2022.01)

(52) U.S. Cl.
    CPC .......... *G06F 40/205* (2020.01); *G06F 40/253* (2020.01); *G06F 40/258* (2020.01); *G06N 20/00* (2019.01); *H04L 63/102* (2013.01)

(56) References Cited

U.S. PATENT DOCUMENTS

| | | | |
|---|---|---|---|
| 8,266,148 | B2 | 9/2012 | Guha et al. |
| 8,396,894 | B2 | 3/2013 | Jacobson et al. |
| 9,569,729 | B1* | 2/2017 | Oehrle ................. G06Q 10/063 |
| 9,628,501 | B2 | 4/2017 | Datta Ray et al. |
| 9,811,849 | B2 | 11/2017 | Bursey |
| 2011/0066589 | A1 | 3/2011 | Chang et al. |
| 2011/0282710 | A1 | 11/2011 | Akkiraju et al. |
| 2014/0164417 | A1 | 6/2014 | Balakrishnan et al. |
| 2016/0188568 | A1* | 6/2016 | Srinivasan .............. G06F 40/30 704/9 |
| 2016/0357861 | A1* | 12/2016 | Carlhian ................. G06F 16/36 |
| 2017/0056764 | A1* | 3/2017 | Shukla ................... G06N 20/10 |
| 2017/0116054 | A1* | 4/2017 | Boddhu ................. G06N 20/00 |
| 2017/0262412 | A1* | 9/2017 | Liang ..................... G06F 40/10 |
| 2018/0189691 | A1* | 7/2018 | Oehrle ................... G06N 7/005 |
| 2020/0097597 | A1* | 3/2020 | Lourentzou ........... G06F 40/211 |

OTHER PUBLICATIONS

Thapen, N. et al. (2016). "The Early Bird Catches the Term: Combining Twitter and News Data for Even Detection and Situational Awareness," retrieved from https://arxiv.org/pdf/1504.02335.pdf; 11 pages.

* cited by examiner

SYSTEM AND METHOD FOR IDENTIFICATION AND PROFILING ADVERSE EVENTS

PRIORITY CLAIM

This U.S. patent application claims priority under 35 U.S.C. § 119 to: India Application No. 201921051876, filed on Dec. 13, 2019. The entire contents of the aforementioned application are incorporated herein by reference.

TECHNICAL FIELD

This disclosure relates generally to the field of data processing, and more particularly to data processing pertaining to adverse event identification and profiling.

BACKGROUND

An adverse event is an unfavorable and unintended occurrence associated with an entity. An adverse event may indicate technical risk or financial risk in certain scenarios. For instance, an adverse event analyst or a risk analyst identifies and analyses potential risks threatening the financial position of commercial and industrial corporations and public/private organizations. Risk analysis requires keeping track of events that may impact the financial state of an organization and thereby impact all stakeholders related to that organization. On identifying potential risks, risk analysts recommend strategies to avoid or minimize them. This requires daily monitoring of a large number of sources and documents. Given the large amount of information that gets generated and disseminated in today's digital era, this becomes humanly impossible and error prone without appropriate computational aids.

The inventors here have recognized several technical problems with such conventional systems, as explained below. In the field of data processing, more specifically, technical adverse event profiling is a process of gathering information relevant to a particular topic or event from a plurality of sources and storing them for easy retrieval and reference. Generally, the technical adverse event profiling can be performed either manually or as an automated process. In the manual event profiling process, profiling experts can be engaged in gathering, filing, cleaning and compiling reliable information for different categories of end consumers. The automated event profiling of information from multiple textual sources is an emerging field in the field of data processing.

SUMMARY

Embodiments of the present disclosure present technological improvements as solutions to one or more of the above-mentioned technical problems recognized by the inventors in conventional systems. For example, in one embodiment, a processor implemented method for adverse event profiling of at least one entity is provided. The processor implemented method includes at least one of: receiving, by one or more hardware processors, a set of articles from a plurality of data sources; extracting, by the one or more hardware processors, a plurality of metadata from the set of articles to obtain a plurality of groups and associated information; identifying, by the one or more hardware processors, relevant linguistic features corresponding to each group among the plurality of groups and the associated information by utilizing a set of Natural Language Processors (NLPs) to obtain an analyzed data set; disambiguating, by the one or more hardware processors, one or more entities from the analyzed data set to obtain a disambiguated data set comprising one or more disambiguating entities; and determining the presence or an absence of at least one adverse event comprises: identifying, by the one or more hardware processors, at least one of one or more implicit adverse event and one or more explicit adverse events from the disambiguated data set. In an embodiment, the one or more explicit adverse events are identified based on a comparison of one or more sentences from the disambiguated data set with at least one of one or more positive sentences and one or more negative sentences being stored in a database comprised in a memory. In an embodiment, the one or more positive or negative sentences are identified based on the one or more entities being disambiguated. In an embodiment, the one or more implicit adverse events are derived from the one or more explicit adverse events associated with related entities of the one or more disambiguated entities.

In an embodiment, the step of analyzing the plurality of groups may further identify relevant linguistic features corresponding to each group among the plurality of groups by utilizing the set of language specific NLPs includes: pre-processing the plurality of news of each group by a preprocessor of the set of language specific NLPs implemented by the one or more processors to: extract a set of raw news text and a set of headlines corresponding to the set of raw news text, and remove Hypertext Markup Language (HTML) tags and foreign language characters from the extracted set of raw news text; performing Part-Of-Speech (POS) tagging on the pre-processed set of news articles by a dependency parser of the set of language specific NLPs; extracting a root verb from the POS tagging; identifying tense, aspect and modality of the root verb by a morphological analyzer of the set of language specific NLPs; and performing named entity extraction and resolution to identify different entity names by a Named Entity Recognizer (NER) of the set of language specific NLPs. In an embodiment, an entity resolver may resolve a set of different entity names obtained from the NER.

In an embodiment, the one or more adverse events may be derived from the one or more explicit adverse events are identified by applying a machine learning technique on adverse event bearing sentences on the disambiguated data set and associated with co-occurring entities. In an embodiment, the one or more adverse events may be associated with the co-occurring entities based on one or more linguistic features identified in the disambiguated data set.

In an embodiment, the one or more implicit adverse events may be identified by using an ontology based adverse event identification framework. In an embodiment, the method may further include, performing, by the one or more hardware processors, a key entity extraction using entity statistics pertaining to a given document to obtain at least one key entity in a document. In an embodiment, the at least one key entity in the document may corresponds to maximally occurring entity in the given document. In an embodiment, the sentiment of each sentence in the document may be determined by performing sentiment extraction and analysis. In an embodiment, the one or more explicit adverse events may be identified by using an attention based bi-directional long short term memory network for technical entity adverse event classification. In an embodiment, the one or more implicit adverse events may be identified by using an ontology based adverse event identification framework. In an embodiment, may further include providing the updated event ontology based adverse event identification for continuous learning.

In another aspect, there is provided a processor implemented system to adverse event profiling of at least one entity is provided. The system include a memory storing instructions; one or more communication interfaces; and one or more hardware processors coupled to the memory via the one or more communication interfaces, wherein the one or more hardware processors are configured by the instructions to: receive, a set of articles from a plurality of data sources; extract, a plurality of metadata from the set of articles to obtain a plurality of groups and associated information; identify, relevant linguistic features corresponding to each group among the plurality of groups and the associated information by utilizing a set of Natural Language Processors (NLPs) to obtain an analyzed data set; disambiguate, one or more entities from the analyzed data set to obtain a disambiguated data set comprising one or more disambiguating entities; and determine, the presence or an absence of at least one adverse event. In an embodiment, based on the determined presence, at least one of one or more implicit adverse events and one or more explicit adverse events are identified from the disambiguated data set. In an embodiment, the one or more explicit adverse events are identified based on a comparison of one or more sentences from the disambiguated data set with at least one of one or more positive sentences and one or more negative sentences being stored in a database comprised in a memory. In an embodiment, the one or more positive or negative sentences are identified based on the one or more entities being disambiguated. In an embodiment, the one or more implicit adverse events are derived from the one or more explicit adverse events associated with related entities of the one or more disambiguated entities.

In an embodiment, the one or more hardware processors may further configured by the instructions to: analyze the plurality of groups to identify relevant linguistic features corresponding to each group among the plurality of groups by utilizing the set of language specific NLPs which further includes: pre-process the plurality of news of each group by a preprocessor of the set of language specific NLPs implemented by the one or more processors to: extract a set of raw news text and a set of headlines corresponding to the set of raw news text, and remove Hypertext Markup Language (HTML) tags and foreign language characters from the extracted set of raw news text; perform Part-Of-Speech (POS) tagging on the pre-processed set of news articles by a dependency parser of the set of language specific NLPs; extract a root verb from the POS tagging; identify tense, aspect and modality of the root verb by a morphological analyser of the set of language specific NLPs; and perform named entity extraction and resolution to identify different entity names by a Named Entity Recognizer (NER) of the set of language specific NLPs. In an embodiment, an entity resolver may resolve a set of different entity names obtained from the NER.

In an embodiment, the one or more adverse events may be derived from the one or more explicit adverse events are identified by applying a machine learning technique on adverse event bearing sentences on the disambiguated data set and associated with co-occurring entities. In an embodiment, the one or more adverse events may be associated with the co-occurring entities based on one or more linguistic features identified in the disambiguated data set.

In an embodiment, the one or more implicit adverse events may be identified by using an ontology based adverse event identification framework. In an embodiment, the one or more hardware processors may further configured by the instructions to perform a key entity extraction using entity statistics pertaining to a given document to obtain at least one key entity in a document. In an embodiment, the at least one key entity in the document may correspond to maximally occurring entity in the given document. In an embodiment, the sentiment of each sentence in the document may be determined by performing sentiment extraction and analysis. In an embodiment, the one or more explicit adverse events may be identified by using an attention based bi-directional long short term memory network for technical entity adverse event classification. In an embodiment, the one or more implicit adverse events may be identified by using an ontology based adverse event identification framework. In an embodiment, may further include providing the updated event ontology based adverse event identification for continuous learning.

In yet another aspect, there are provided one or more non-transitory machine readable information storage mediums comprising one or more instructions which when executed by one or more hardware processors causes at least one of: receiving, a set of articles from a plurality of data sources; extracting, a plurality of metadata from the set of articles to obtain a plurality of groups and associated information; identifying, relevant linguistic features corresponding to each group among the plurality of groups and the associated information by utilizing a set of Natural Language Processors (NLPs) to obtain an analyzed data set; disambiguating, one or more entities from the analyzed data set to obtain a disambiguated data set comprising one or more disambiguating entities; and determining the presence or an absence of at least one adverse event comprises: identifying, at least one of one or more implicit adverse event and one or more explicit adverse events from the disambiguated data set. In an embodiment, the one or more explicit adverse events are identified based on a comparison of one or more sentences from the disambiguated data set with at least one of one or more positive sentences and one or more negative sentences being stored in a database comprised in a memory. In an embodiment, the one or more positive or negative sentences are identified based on the one or more entities being disambiguated. In an embodiment, the one or more implicit adverse events are derived from the one or more explicit adverse events associated with related entities of the one or more disambiguated entities.

In an embodiment, the step of analyzing the plurality of groups may further identify relevant linguistic features corresponding to each group among the plurality of groups by utilizing the set of language specific NLPs includes: pre-processing the plurality of news of each group by a preprocessor of the set of language specific NLPs implemented by the one or more processors to: extract a set of raw news text and a set of headlines corresponding to the set of raw news text, and remove Hypertext Markup Language (HTML) tags and foreign language characters from the extracted set of raw news text; performing Part-Of-Speech (POS) tagging on the pre-processed set of news articles by a dependency parser of the set of language specific NLPs; extracting a root verb from the POS tagging; identifying tense, aspect and modality of the root verb by a morphological analyzer of the set of language specific NLPs; and performing named entity extraction and resolution to identify different entity names by a Named Entity Recognizer (NER) of the set of language specific NLPs. In an embodiment, an entity resolver may resolve a set of different entity names obtained from the NER.

In an embodiment, the one or more adverse events may be derived from the one or more explicit adverse events are identified by applying a machine learning technique on adverse event bearing sentences on the disambiguated data set and associated with co-occurring entities. In an embodiment, the one or more adverse events may be associated with the co-occurring entities based on one or more linguistic features identified in the disambiguated data set.

In an embodiment, the one or more implicit adverse events may be identified by using an ontology based adverse event identification framework. In an embodiment, the one or more hardware processors may further configured by the instructions to perform a key entity extraction using entity statistics pertaining to a given document to obtain at least one key entity in a document. In an embodiment, the at least one key entity in the document may correspond to maximally occurring entity in the given document. In an embodiment, the sentiment of each sentence in the document may be determined by performing sentiment extraction and analysis. In an embodiment, the one or more explicit adverse events may be identified by using an attention based bi-directional long short term memory network for technical entity adverse event classification. In an embodiment, the one or more implicit adverse events may be identified by using an ontology based adverse event identification framework. In an embodiment, may further include providing the updated event ontology based adverse event identification for continuous learning.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Natural Language Processing (NLP) techniques for identification and profiling of adverse events from information extracted from a plurality of data sources such as published news articles from internet, microblogs, technical and scholarly articles, content from social media, and the like and the like is an area of research and development. An adverse event refers generically to risks of a plurality of categories such as medical, financial or technical related and the like. In some scenarios, set of articles, also referred as one or more digital documents. The term 'Adverse event', within the scope and meaning used in this document, refers generically to risks of a plurality of types: technical, financial or medical related and the like. Identification of an adverse event refers to the detection of either one of a presence or absence of an adverse event in one or more data sources which may include one or more documents, web applications, or any other information sources on the internet. In one embodiment, profiling of an identified adverse event refers to the nature, origin and the relationships thereof.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

Figure 1:
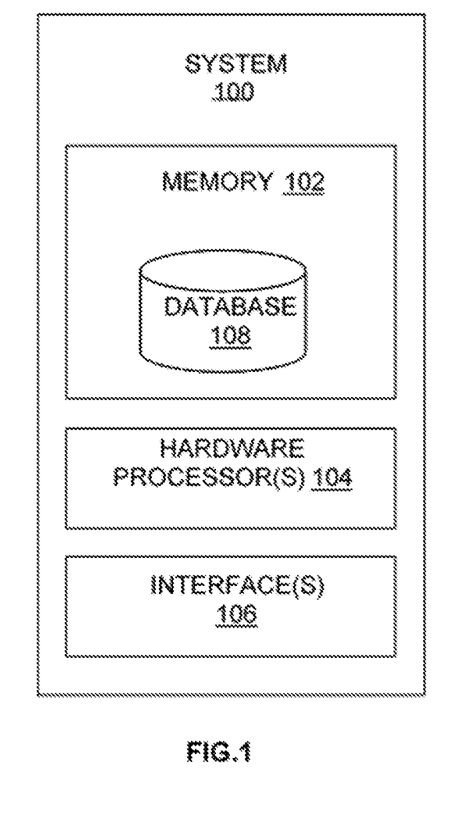
FIG. 1 illustrates a system for identifying and profiling adverse events, according to some embodiments of the present disclosure.

FIG. 1 illustrates a system for identifying and profiling adverse events, according to some embodiments of the present disclosure. In an embodiment, the system 100 includes one or more processors 104, communication interface device(s) or input/output (I/O) interface(s) 106, and one or more data storage devices or memory 102 operatively coupled to the one or more processors 104. The memory 102 comprises a database 108. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules and a repository for storing data processed, received, and generated by the plurality of modules. The plurality of modules may include routines, programs, objects, components, data structures, and so on, which perform particular tasks or implement particular abstract data types.

Further, the database 108 stores information pertaining to inputs fed to the system 100 and/or outputs generated by the system 100 (e.g., data/output generated at each stage of the data processing), specific to the methodology described herein. More specifically, the database 108 stores information being processed at each step of the proposed methodology.

The repository, amongst other things, includes a system database and other data. The other data may include data generated as a result of the execution of one or more modules in the plurality of modules.

Figure 2:
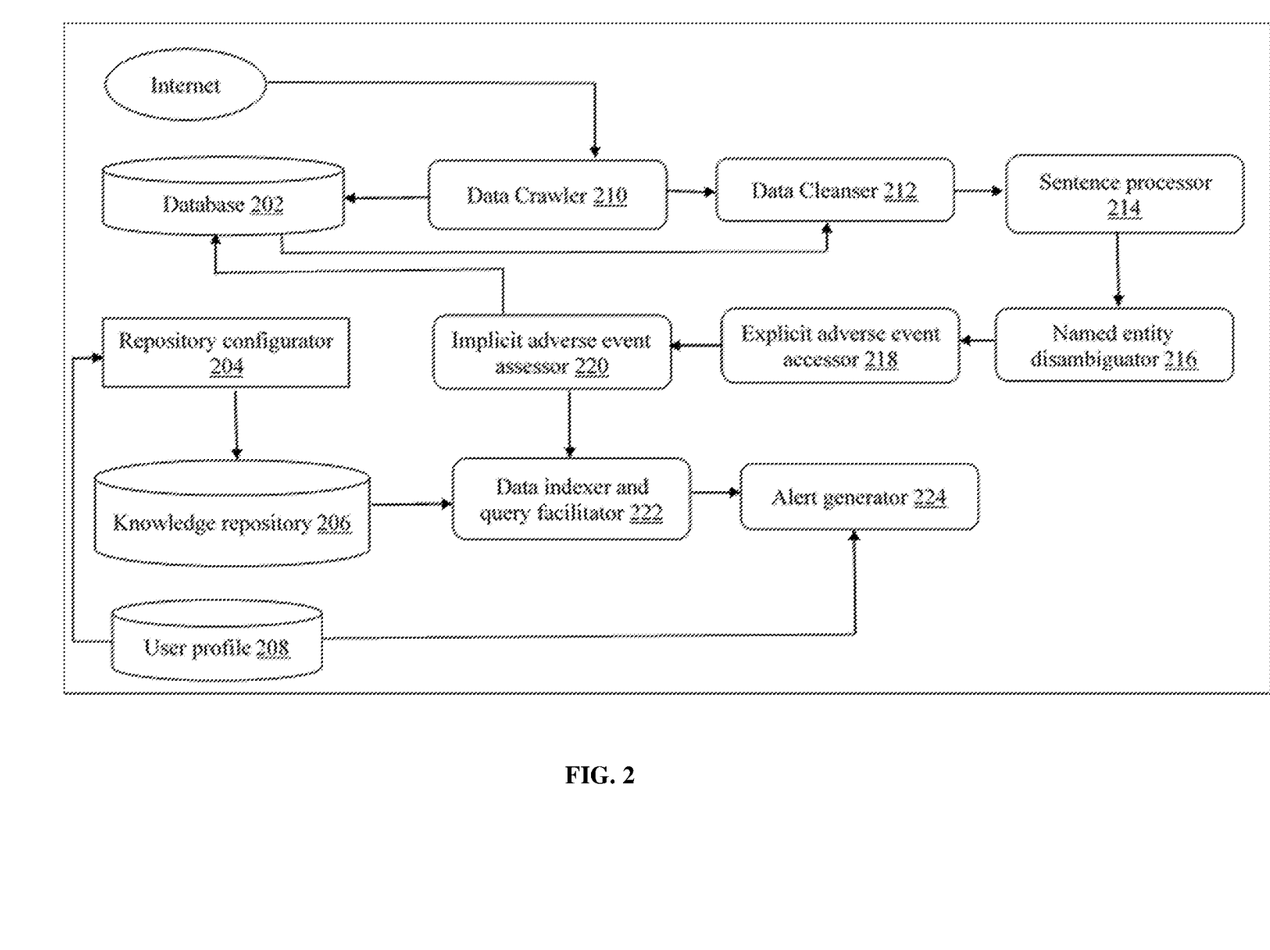
FIG. 2 illustrates an exemplary system for identifying and profiling adverse events, according to some embodiments of the present disclosure.

FIG. 2 illustrates an exemplary system for identifying and profiling adverse events, according to some embodiments of the present disclosure. The adverse event identification and profiling system 200 includes a database 202, a repository configurator 204, a knowledge repository 206, a user profile 208, a data crawler 210, a data cleanser 212, a sentence processor 214, a named entity disambiguator 216, an explicit adverse events assessor 218, an implicit adverse events assessor 220, a data indexer and query facilitator 222, and an alert generator 224. The adverse event identification and profiling system 200 is designed as a multi-user system. The one or more configuration parameters required for a system setup and during the instantiation are at least one of (i) user specified list of news websites, (ii) User specified organizations of interest, (iii) each user are authorized to select one or more events of interest for which an alert mechanism is to be invoked.

In an embodiment, the database 202 corresponds to a storage database holding at least (i) information associated with the data crawler 210, (ii) the information associated with the explicit adverse events assessor 218, (iii) the information associated with the implicit adverse events assessor 220. The repository configurator 204 stores information associated with plurality of user profiles. The data crawler 210 is configured to acquire an information. For example, the information corresponds to news articles retrieved using RSS feed readers and also captured news from pre-defined news sites. In an embodiment, the information may corresponds to a metadata related to news articles. In an embodiment, a list of predefined sites is provided to the adverse event identification and profiling system 200 during configuration. In an embodiment, the data crawler 210 includes a primary functionalities of capturing and collecting news articles published across different news websites. The data cleanser 212 is configured to clean each crawled news article thereby removing one or more HTML tags and metadata elements such as a title, a publisher, a date of publication, information associated with author are extracted and stored in the knowledge repository 206 along with a text content.

The sentence processor 214 is configured to extract from one or more sentences from a one or more information sources e.g., news articles. In an exemplary embodiment, in each sentence, a sequence of Natural Language Processing (NLP) tasks are performed on title and content of each news articles to extract various relevant information. For example, standard tools like Stanford coreNLP and/or Spacy NLP API are utilized. The NLP provides a set of human language technology tools.

The NLP tools perform plurality of activities including but not limited to: (a) converting words to the base forms; (b) identify and tag each word with Parts of speech i.e. whether it is a noun, verb, adjective etc; (c) analyse the structure of sentences and identify phrases and syntactic dependencies between pairs of words; (d) detect named entities like names of people, places and organizations; (e) performs co-reference resolution such that pronouns used within a sentence are linked with the named entities; (f) detects sentiment associated to each sentence. For example, sentiment is indicated on a 5-point scale. The values corresponding to the 5-point scale are very negative, negative, neutral, positive, and very positive. In another exemplary embodiment, following scenario based sentence pertaining to recognition of the named entities is presented i.e., "ABC lab deploys technology interns to conduct experimentation of scientist XYZ in the United States". In this example, the named entity outputs of the sentence resolves as follows: {the ABC lab} corresponds to an organization (ORG) and {the scientist XYZ} corresponds to person respectively. In yet another exemplary embodiment, the following sentence is presented: "ABC lab deploys technology interns to conduct its experimentation in the United States". In the instant example, a coreference resolution is indicated wherein the word 'its' is linked the named entity "the ABC lab" which is detected as an organization.

The named entity disambiguator 216 is configured to process and resolve ambiguous information. The process of resolving multiple different mentions of the same named entity to a common form is known as an entity disambiguation. In an example embodiment, a single entity can be mentioned in different ways. For example, TCS is mentioned as "TCS", "Tata Consultancy Services", "TCSL" etc. In an embodiment, computer is not configured to determine that they are the same entity without specialized mechanisms. The resolved common form is used as a global identifier for the named entity and helps to facilitate analytics that is performed on top of the information associated with the named entity. In an embodiment, after disambiguation, a unique identifier for each entity is returned by the adverse event identification and profiling system 200.

In an embodiment, each sentence from the disambiguated data set is sent as input to a multi-objective function. The primary objective of the multi-objective function is to decide whether the sentence is an adverse event sentence or not. Similarly, the subsequent objective is to identify the adverse event word if adverse event is detected. The function outputs 1 for adverse event and 0 for non-adverse event. In one implementation, bi-LSTM networks are used to detect adverse event and associated adverse event keyword.

The explicit adverse events assessor 218 is configured to determine presence or absence of one or more adverse event references in an information source including but not limited to a database, repository, article, news journal or sentence. In an embodiment, during system configuration a list of adverse events are preloaded. In an embodiment, for each event, positive and negative samples of adverse event bearing sentences along with organizations whom it affects are obtained to train a two-step machine learning system which can automatically identify adverse event bearing sentences from prospective or real-time news articles. In one implementation, a deep learning algorithm which deploys an attention based bi-directional long-short term memory networks for adverse event classification. The said algorithm is configured to dynamically learn new adverse events that are not mentioned in the list of adverse events are preloaded. In an embodiment, deployment of the deep learning algorithm ensures synonyms are factored.

In another implementation, machine learning algorithm to the adverse event bearing sentences identified to associate the adverse event to one or more co-occurring organization. The explicit adverse event assessor 218 exploit linguistic features such as one or more dependency relations among words, named entities etc., to obtain optimized associations.

In an embodiment, a single sentence may contain many organization names along with an adverse event though said adverse event may not affect all the organization. In an embodiment, once the adverse event is detected, the adverse event identification and profiling system 200 assign one or more severity scores based on a risk significance provided by a domain experts. Following are examples of annotated sentences, wherein the adverse event are highlighted in brackets whereas the organization are underlined.

Positive Sample 1: "For the quarter ended Mar. 31, 2018, ORG A posted its first-ever {quarterly loss} at 2,188 crores, with a threefold increase in its provisions for bad loans."

Positive Sample 2: "Traditional IT players such as ORG A and ORG B are {struggling} to keep pace with the likes of ORG C and ORG D, which provide cloud-based computing services at much cheaper rates."

Negative Sample: "Despite its current challenges, ORG A is not struggling as much as current speculation suggests, XYZ, CEO of ORG B, told news agency A on Friday."

In an embodiment, an adverse event sentence, adverse event keyword and co-occurring named entities are inputted to a function for identification of appropriate adverse event-entity association. The function exploits linguistic features such as dependency relations among words, named entities etc. to obtain one or more associations respectively. In an embodiment a co-occuring named entity may also be referred to as a "co-reference entity". Co-reference resolution corresponds to co-occuring named entities.

The task of this function is to assign 0 or 1 score to an entity-event pair where 0 represents incorrect and 1 represents correct entity-event association. In one implementation, a Gradient boosted trees function is deployed to determine the appropriate association. The function output is enlisted herewith:

Org1-struggling=1

Org2-struggling=1

Org3-struggling=0

Org4-struggling=0

This denotes that the adverse event specified by keyword 'struggling' is for Org1 and Org2 and not for Org3 and Org4. Considering the function articulated above, a negative sentiment is extracted for the whole document, if there is no adverse event detected in the document. An adverse event due to presence of negative sentiment is assigned to the key entity identified for the document.

In an embodiment, an entity but not limited to an organization can also experience an adverse event if any of corresponding stakeholders are exposed to an adverse event. The implicit adverse events assessor 220 is configured to determine one or more implicit adverse events that are likely to affect the entity but not limited to the organization from explicit adverse event encountered by any of corresponding stakeholders assessed through a plurality of information sources including but not limited to news sources. In one embodiment, assessment is performed by the knowledge repository 206 in conjunction with an ontology framework as referenced in FIG. 4. For example, the ontology framework corresponds to an enterprise ontology.

Figure 4:
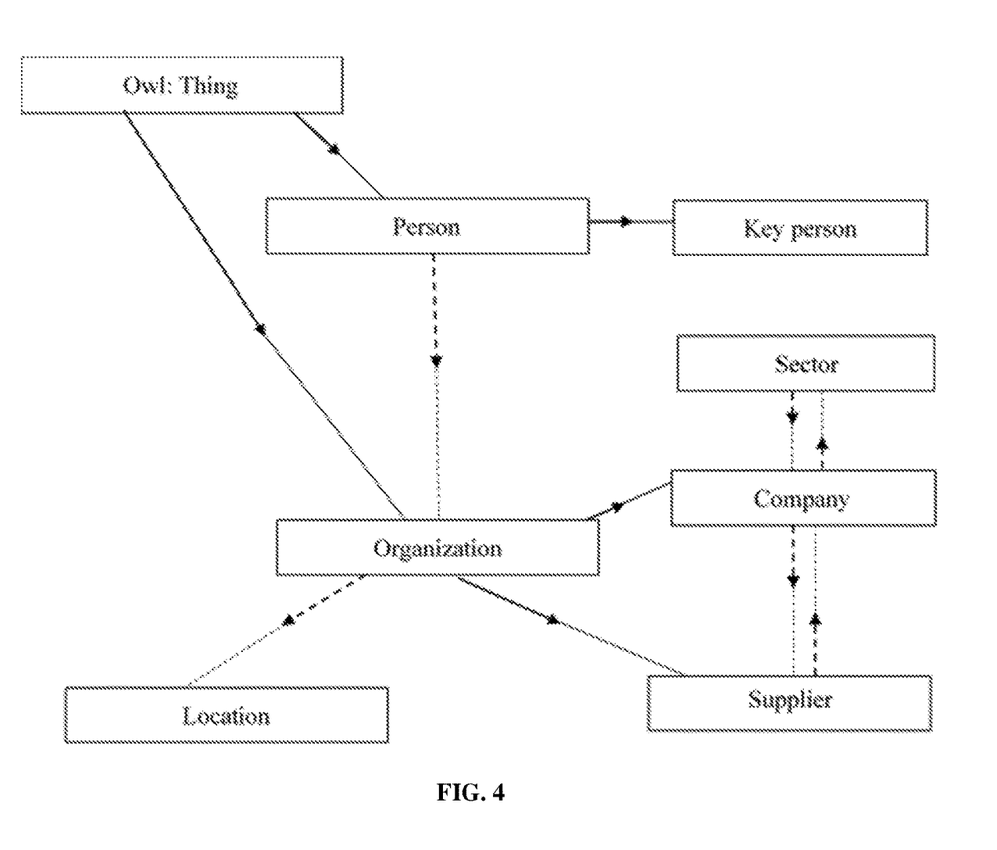
FIG. 4 illustrates an exemplary ontology framework, according to some embodiments of the present disclosure.

In an example embodiment, a representative scenario involving a query language (QLs) that can be deployed to query Resource Description Framework (RDF) and Web Ontology Languages (OWL) are presented below:

```
SELECT DISTINCT? Lab WHERE {
 dbo: Lab1 dbp: industry ?industry
 ?Lab1 dbp: industry ?industry
 dbo:Lab1 loc:country ?country}
 SELECT DISTINCT ? lab WHERE {
 ?Lab1 dbp: industry res:Metallurgy
 dbo: Lab1 dbp: industry ?industry
 dbo:Lab1 loc:country ?country}
```

A query is depicted through which risk detected for 'Lab1' is propagated to its co-references viz. 'LAb2' through 'Lab4'. Similarly, query to retrieve laboratories involved in metallurgy across a given geography is presented. The adverse event identified for the metallurgy sector is associated to one or more laboratories 'Lab5' through 'Lab8'.

The data indexer and query facilitator 222 is configured to enable searching enriched data repository and to technically aid one or more customized early alerts. For example, each news document along with one or more extracted metadata and information such as adverse events, named entities etc. is indexed into a SOLR index. For example, an Apache SOLR is an enterprise search platform that facilitates optimal text query processing and retrieval.

The alert generator 224 is configured to issue automated alerts based on a plurality of parameters including to but not limited to date of event, news source, publisher etc.

In an embodiment, the automated alerts are delivered to an individual user. In an embodiment, the user is prompted with functionality to provide one or more feedbacks on alert associated with the one or more adverse events. The one or more feedbacks are recorded and dynamically train the machine learning algorithms. In an embodiment, the updated event ontology based adverse event identification is provided for continuous learning.

Figure 3:
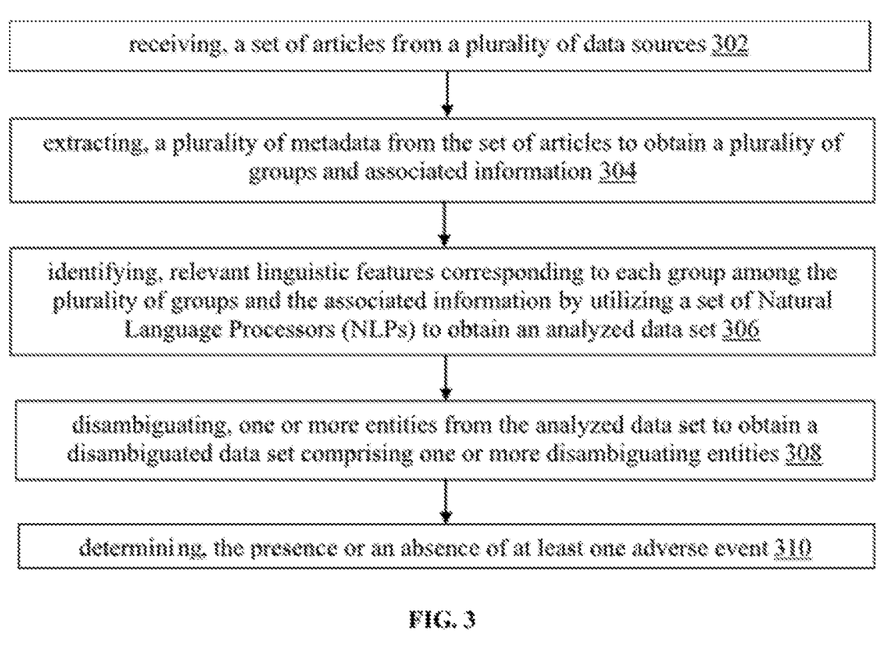
FIG. 3 is an exemplary flow diagram illustrating a method of identifying and profiling adverse events pertaining to at least one entity, according to some embodiments of the present disclosure.

FIG. 3 is an exemplary flow diagram illustrating a method of identifying and profiling adverse events pertaining to at least one entity, according to an embodiment of the present disclosure. In an embodiment, the adverse event identification and profiling system 200 includes one or more data storage devices or the memory 102 operatively coupled to the one or more hardware processors 104 and is configured to store instructions for execution of steps of the method by the one or more processors 104. The flow diagram depicted is better understood by way of following explanation/description. The steps of the method of the present disclosure will now be explained with reference to the components of the adverse event identification and profiling system 200 as depicted in FIG. 2.

At step 302, a set of articles from a plurality of data sources is received. At step 304, a plurality of metadata is extracted from the set of articles to obtain a plurality of groups and associated information. At step 306, relevant linguistic features corresponding to each group among the plurality of groups and the associated information is identified by utilizing a set of Natural Language Processors (NLPs) to obtain an analyzed data set. At step 308, one or more entities is disambiguated from the analyzed data set to obtain a disambiguated data set comprising one or more disambiguating entities. At step 310, the presence or an absence of at least one adverse event is determined. The one or more hardware processors is further configured to identify at least one of one or more implicit adverse event and one or more explicit adverse events from the disambiguated data set. In an embodiment, the one or more explicit adverse events are identified based on a comparison of one or more sentences from the disambiguated data set with at least one of one or more positive sentences and one or more negative sentences being stored in a database comprised in a memory. In an embodiment, the one or more positive or negative sentences are identified based on the one or more entities being disambiguated. In an embodiment, the one or more implicit adverse events are derived from the one or more explicit adverse events associated with related entities of the one or more disambiguated entities.

In an embodiment, the step of analyzing the plurality of groups may further identify relevant linguistic features corresponding to each group among the plurality of groups by utilizing the set of language specific NLPs includes: pre-processing the plurality of news of each group by a preprocessor of the set of language specific NLPs implemented by the one or more processors to: extract a set of raw news text and a set of headlines corresponding to the set of raw news text, and remove Hypertext Markup Language (HTML) tags and foreign language characters from the extracted set of raw news text; performing Part-Of-Speech (POS) tagging on the pre-processed set of news articles by a dependency parser of the set of language specific NLPs; extracting a root verb from the POS tagging; identifying tense, aspect and modality of the root verb by a morphological analyzer of the set of language specific NLPs; and performing named entity extraction and resolution to identify different entity names by a Named Entity Recognizer (NER) of the set of language specific NLPs. In an embodiment, an entity resolver may resolve a set of different entity names obtained from the NER.

A set of NLP analyzers includes a pre-processor, a dependency based syntactic parser, a morphological analyzer, the Named Entity Recognizer (NER), a pronoun resolver and an entity resolver. In an embodiment, the pre-processor extracts from the plurality of news in each group a set of raw news text and a set of headlines of the set of raw news from one or more web pages. Further, the pre-processor removes all Hypertext Markup Language (HTML) tags and foreign language characters from the extracted text.

In an embodiment, the dependency parser, for example, a Stanford parser, performs Part-Of-Speech (POS) tagging and syntactic processing on the pre-processed data. A POS Tagger is a piece of software tool to read the pre-processed data and assigns parts of speech to each functional and content words, including noun, pronoun, verb, adjective, adverbs. Additionally, the POS tagging tokenizes the pre-processed data and labels each word with the corresponding POS. From the output of the POS tagger, root verbs are extracted and passed to the morphological analyzer to identify the tense, aspect and modality of the root verb. A Stanford parser is used to extract different dependency relations within a set of pre-processed sentences. A set of dependency features associated with the Stanford dependency parser includes adverbial clause modifier, auxiliary, negation modifier, marker, referent, open clausal complement, clausal complement, expletive, coordination, passive auxiliary, nominal subject, direct object, and copula, conjunct.

In an embodiment, the one or more adverse events may be derived from the one or more explicit adverse events are identified by applying a machine learning technique on adverse event bearing sentences on the disambiguated data set and associated with co-occurring entities. In an embodiment, the one or more adverse events may be associated with the co-occurring entities based on one or more linguistic features identified in the disambiguated data set.

In an embodiment, the one or more implicit adverse events may be identified by using an ontology based adverse event identification framework. In an embodiment, key entity extraction may be performed using entity statistics. In one embodiment, key entity extraction using entity statistics pertaining to a given document is performed. The key entity in a document is the maximally occurring entity in the given document. For example, if the word "decline" is maximally occurring entity, then, "decline" is designated as "key entity" in the context of adverse event identification, detection and profiling. In an embodiment, the sentiment of each sentence in the document may be determined by performing sentiment extraction and analysis. In an embodiment, sentiment extraction and analysis may include sentiment indicated on a 5-point scale. The values corresponding to the 5-point scale are very negative, negative, neutral, positive, and very positive. In an embodiment, the one or more explicit adverse events may be identified by using an attention based bi-directional long short term memory network for technical entity adverse event classification. Long short-term memory (LSTM) is an artificial recurrent neural network (RNN) architecture used in conjunction with deep learning to detect adverse events. In an embodiment, the one or more implicit adverse events may be identified by using an ontology based adverse event identification framework. In an embodiment, may further include providing the updated event ontology based adverse event identification for continuous learning.

With reference to FIG. 4, illustrates an exemplary ontology framework, according to some embodiments of the present disclosure. In an embodiment, the ontology framework provides a formal way of storing knowledge in a machine interpretable way. For example, the ontology framework is configured to store details pertaining to a specific organization but not limited to such as revenue, key people, products and services, as well as information about corresponding suppliers, partners, clients etc. In an embodiment, part of the ontology framework can be populated from a public data sources such as DBPedia, Freebase etc., and remaining part of the ontology framework can be configured using enterprise internal information from corresponding databases. For example, the remaining part of the ontology framework includes information about clients, suppliers etc. In an embodiment, the ontology is stored in form of a resource description framework (RDF) graph. In one implementation, a graph based propagation mechanism is deployed to compute implicit adverse event that may be assigned to one or more entities that are linked through the ontology framework to the other which include explicit mentions in a news source.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method of identifying and profiling of a plurality of adverse events pertaining to at least one entity, the method comprising:
   receiving, by one or more hardware processors, a set of articles from a plurality of data sources;
   extracting, by the one or more hardware processors, a plurality of metadata from the set of articles to obtain a plurality of groups and associated information;
   identifying, by the one or more hardware processors, relevant linguistic features corresponding to each group among the plurality of groups and the associated information by utilizing a set of Natural Language Processors (NLPs) to obtain an analyzed data set;
   disambiguating, by the one or more hardware processors, one or more entities from the analyzed data set to obtain a disambiguated data set comprising one or more disambiguating entities;
   determining, by the one or more hardware processors, the presence or an absence of at least one adverse event, wherein the determining further comprises:
      identifying, by the one or more hardware processors, at least one of one or more implicit adverse event and one or more explicit adverse events from the disambiguated data set, wherein the one or more explicit adverse events are identified based on a comparison of one or more sentences from the disambiguated data set with at least one of one or more positive sentences and one or more negative sentences being stored in a database comprised in a memory, wherein the one or more positive or negative sentences are identified based on the one or more entities being disambiguated, and wherein the one or more implicit adverse events are derived from the one or more explicit adverse events associated with related entities of the one or more disambiguated entities;
   training, by the one or more hardware processors, a machine learning system by obtaining for each event, positive samples and negative samples of adverse event bearing sentences, to automatically identify the adverse event bearing sentences from real-time articles; and
   identifying, by the one or more hardware processors, one or more adverse event-entity association based on one or more linguistic features identified in the disambiguated data set, wherein an adverse event sentence, an adverse event keyword and co-occurring entities within the adverse event sentence are inputted for identification of the appropriate one or more adverse event-entity association using a Gradient boosted trees function, wherein the Gradient boosted trees function assigns 0 or 1 score to an adverse event-entity pair, where 0 represents an incorrect adverse event-entity association and 1 represents a correct adverse event-entity association, and wherein the one or more linguistic features include dependency relations among the adverse event keyword and the co-occurring entities to obtain the one or more adverse event-entity association.

2. The processor implemented method as claimed in claim 1, wherein the step of analyzing the plurality of groups to identify relevant linguistic features corresponding to each group among the plurality of groups by utilizing the set of language specific NLPs comprises:
   pre-processing the plurality of news of each group by a preprocessor of the set of language specific NLPs implemented by the one or more processors to:
      extract a set of raw news text and a set of headlines corresponding to the set of raw news text, and remove Hypertext Markup Language (HTML) tags and foreign language characters from the extracted set of raw news text;

performing Part-Of-Speech (POS) tagging on the pre-processed set of news articles by a dependency parser of the set of language specific NLPs;

extracting a root verb from the POS tagging;

identifying tense, aspect and modality of the root verb by a morphological analyser of the set of language specific NLPs; and performing named entity extraction and resolution to identify different entity names by a Named Entity Recognizer (NER) of the set of language specific NLPs, wherein an entity resolver resolves a set of different entity names obtained from the NER.

3. The processor implemented method as claimed in claim 1, wherein the one or more adverse events derived from the one or more explicit adverse events are identified by applying a machine learning technique on the adverse event bearing sentences on the disambiguated data set and associated with the co-occurring entities, wherein the one or more adverse events are associated with the co-occurring entities based on the one or more linguistic features identified in the disambiguated data set.

4. The processor implemented method as claimed in claim 1, wherein the one or more implicit adverse events are identified by using an ontology based adverse event identification framework, wherein a graph based propagation mechanism is deployed to identify the one or more implicit adverse events that are assigned to the one or more entities that are linked through the ontology based adverse event identification framework.

5. The processor implemented method as claimed in claim 1, further comprising, performing, by the one or more hardware processors, a key entity extraction using entity statistics pertaining to a given document to obtain at least one key entity in a document, wherein the at least one key entity in the document corresponds to maximally occurring entity in the given document.

6. The processor implemented method as claimed in claim 1, wherein the sentiment of each sentence in the document is determined by performing sentiment extraction and analysis.

7. The processor implemented method as claimed in claim 1, wherein the one or more explicit adverse events are identified by using an attention based bi-directional long short term memory network for technical entity adverse event classification, wherein a deep learning algorithm deploys the attention based bi-directional long-short term memory network and the deep learning algorithm is configured to dynamically learn adverse events that are not mentioned in a list of adverse events that are preloaded during a system configuration.

8. The processor implemented method as claimed in claim 1, further comprising, providing the updated event ontology based adverse event identification for continuous learning.

9. A system (100) for identifying and profiling of a plurality of adverse events pertaining to at least one entity, wherein the system comprising:
a memory (102) storing instructions;
one or more communication interfaces (106); and
one or more hardware processors (104) coupled to the memory (102) via the one or more communication interfaces (106), wherein the one or more hardware processors (104) are configured by the instructions to:
receive, a set of articles from a plurality of data sources;
extract, a plurality of metadata from the set of articles to obtain a plurality of groups and associated information;
identify, relevant linguistic features corresponding to each group among the plurality of groups and the associated information by utilizing a set of Natural Language Processors (NLPs) to obtain an analyzed data set;
disambiguate, one or more entities from the analysed data set to obtain a disambiguated data set comprising one or more disambiguating entities;
determine, the presence or an absence of at least one adverse event, wherein based on the determined presence, at least one of one or more implicit adverse events and one or more explicit adverse events are identified from the disambiguated data set, wherein the one or more explicit adverse events are identified based on a comparison of one or more sentences from the disambiguated data set with at least one of one or more positive sentences and one or more negative sentences being stored in a database comprised in a memory, wherein the one or more positive or negative sentences are identified based on the one or more entities being disambiguated, and wherein the one or more implicit adverse events are derived from the one or more explicit adverse events associated with related entities of the one or more disambiguated entities;
train, by the one or more hardware processors, a machine learning system by obtaining for each event, positive samples and negative samples of adverse event bearing sentences, to automatically identify the adverse event bearing sentences from real-time articles; and
identify, one or more adverse event-entity association based on one or more linguistic features identified in the disambiguated data set, wherein an adverse event sentence, an adverse event keyword and co-occurring entities within the adverse event sentence are inputted for identification of the appropriate one or more adverse event-entity association using a Gradient boosted trees function, wherein the Gradient boosted trees function assigns 0 or 1 score to an adverse event-entity pair, where 0 represents an incorrect adverse event-entity association and 1 represents a correct adverse event-entity association, and wherein the one or more linguistic features include dependency relations among the adverse event keyword and the co-occurring entities to obtain the one or more adverse event-entity association.

10. The system as claimed in claim 9, wherein the step of analyzing the plurality of groups to identify relevant linguistic features corresponding to each group among the plurality of groups by utilizing the set of language specific NLPs comprises:
pre-process the plurality of news of each group by a preprocessor of the set of language specific NLPs implemented by the one or more processors to:
extract a set of raw news text and a set of headlines corresponding to the set of raw news text, and
remove Hypertext Markup Language (HTML) tags and foreign language characters from the extracted set of raw news text;
perform Part-Of-Speech (POS) tagging on the pre-processed set of news articles by a dependency parser of the set of language specific NLPs;
extract a root verb from the POS tagging;

identify tense, aspect and modality of the root verb by a morphological analyser of the set of language specific NLPs; and perform named entity extraction and resolution to identify different entity names by a Named Entity Recognizer (NER) of the set of language specific NLPs, wherein an entity resolver resolves a set of different entity names obtained from the NER.

11. The system as claimed in claim 9, wherein the one or more adverse events derived from the one or more explicit adverse events are identified by applying a machine learning technique on the adverse event bearing sentences on the disambiguated data set and associated with the co-occurring entities, wherein the one or more adverse events are associated with the co-occurring entities based on the one or more linguistic features identified in the disambiguated data set.

12. The system as claimed in claim 9, wherein the one or more implicit adverse events are identified by using an ontology based adverse event identification framework, wherein a graph based propagation mechanism is deployed to identify the one or more implicit adverse events that are assigned to the one or more entities that are linked through the ontology based adverse event identification framework.

13. The system as claimed in claim 9, wherein the one or more hardware processors are further configured to perform a key entity extraction using entity statistics pertaining to a given document to obtain at least one key entity in a document, wherein the at least one key entity in the document corresponds to maximally occurring entity in the given document.

14. The system as claimed in claim 9, wherein the sentiment of each sentence in the document is determined by performing sentiment extraction and analysis.

15. The system as claimed in claim 9, wherein the one or more explicit adverse events are identified by using an attention based bi-directional long short term memory network for technical entity adverse event classification, wherein a deep learning algorithm deploys the attention based bi-directional long-short term memory network and the deep learning algorithm is configured to dynamically learn adverse events that are not mentioned in a list of adverse events that are preloaded during a system configuration.

16. The system as claimed in claim 9, wherein the one or more hardware processors further configured to provide the updated event ontology based adverse event identification for continuous learning.

17. One or more non-transitory machine readable information storage mediums comprising one or more instructions which when executed by one or more hardware processors cause:

receiving a set of articles from a plurality of data sources;

extracting a plurality of metadata from the set of articles to obtain a plurality of groups and associated information;

identifying relevant linguistic features corresponding to each group among the plurality of groups and the associated information by utilizing a set of Natural Language Processors (NLPs) to obtain an analyzed data set;

disambiguating one or more entities from the analyzed data set to obtain a disambiguated data set comprising one or more disambiguating entities;

determining the presence or an absence of at least one adverse event, wherein the determining further comprises:

identifying at least one of one or more implicit adverse event and one or more explicit adverse events from the disambiguated data set, wherein the one or more explicit adverse events are identified based on a comparison of one or more sentences from the disambiguated data set with at least one of one or more positive sentences and one or more negative sentences being stored in a database comprised in a memory, wherein the one or more positive or negative sentences are identified based on the one or more entities being disambiguated, and wherein the one or more implicit adverse events are derived from the one or more explicit adverse events associated with related entities of the one or more disambiguated entities;

training, by the one or more hardware processors, a machine learning system by obtaining for each event, positive samples and negative samples of adverse event bearing sentences, to automatically identify the adverse event bearing sentences from real-time articles; and identifying one or more adverse event-entity association based on one or more linguistic features identified in the disambiguated data set, wherein an adverse event sentence, an adverse event keyword and co-occurring entities within the adverse event sentence are inputted for identification of the appropriate one or more adverse event-entity association using a Gradient boosted trees function, wherein the Gradient boosted trees function assigns 0 or 1 score to an adverse event-entity pair, where 0 represents an incorrect adverse event-entity association and 1 represents a correct adverse event-entity association, and wherein the one or more linguistic features include dependency relations among the adverse event keyword and the co-occurring entities to obtain the one or more adverse event-entity association.

18. The one or more non-transitory machine readable information storage mediums of claim 17, wherein the step of analyzing the plurality of groups to identify relevant linguistic features corresponding to each group among the plurality of groups by utilizing the set of language specific NLPs comprises:

pre-processing the plurality of news of each group by a preprocessor of the set of language specific NLPs implemented by the one or more processors to:

extract a set of raw news text and a set of headlines corresponding to the set of raw news text, and remove Hypertext Markup Language (HTML) tags and foreign language characters from the extracted set of raw news text;

performing Part-Of-Speech (POS) tagging on the pre-processed set of news articles by a dependency parser of the set of language specific NLPs;

extracting a root verb from the POS tagging;

identifying tense, aspect and modality of the root verb by a morphological analyser of the set of language specific NLPs; and performing named entity extraction and resolution to identify different entity names by a Named Entity Recognizer (NER) of the set of language specific NLPs, wherein an entity resolver resolves a set of different entity names obtained from the NER.

19. The one or more non-transitory machine readable information storage mediums of claim 17, wherein the one or more adverse events derived from the one or more explicit adverse events are identified by applying a machine learning technique on the adverse event bearing sentences on the disambiguated data set and associated with the co-occurring entities, wherein the one or more adverse events are associated with the co-occurring entities based on the one or more linguistic features identified in the disambiguated data set.

20. The one or more non-transitory machine readable information storage mediums of claim 17, wherein the one or more implicit adverse events are identified by using an ontology based adverse event identification framework, wherein a graph based propagation mechanism is deployed to identify the one or more implicit adverse events that are assigned to the one or more entities that are linked through the ontology based adverse event identification framework.

\* \* \* \* \*